United States Patent
Teknos et al.

(10) Patent No.: US 10,174,831 B2
(45) Date of Patent: Jan. 8, 2019

(54) MANUAL SHIFTER REVERSE LOCKOUT MECHANISM WITH VIBRATION ISOLATION SYSTEM

(71) Applicant: FORD GLOBAL TECHNOLOGIES, LLC, Dearborn, MI (US)

(72) Inventors: Athanasios K. Teknos, Rochester Hills, MI (US); Chin L. Vong, Livonia, MI (US); Jeffrey M. Albers, Willis, MI (US); Stephen M. Duane, Plymouth, MI (US); Todd C. Trombley, Farmington Hill, MI (US); James R. Backus, Wittmann, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 349 days.

(21) Appl. No.: 15/184,098

(22) Filed: Jun. 16, 2016

(65) Prior Publication Data
US 2017/0097089 A1    Apr. 6, 2017

Related U.S. Application Data

(60) Provisional application No. 62/236,181, filed on Oct. 2, 2015.

(51) Int. Cl.
*F16H 59/04* (2006.01)
*F16H 59/02* (2006.01)

(52) U.S. Cl.
CPC .......... *F16H 59/04* (2013.01); *F16H 59/0208* (2013.01); *F16H 2059/048* (2013.01)

(58) Field of Classification Search
CPC . F16H 2059/048; F16H 59/0208; F16H 59/04

USPC ........................................................ 74/473.22
See application file for complete search history.

(56) References Cited

U.S. PATENT DOCUMENTS

| 3,998,110 A | * | 12/1976 | O'Brien | F16H 59/042 |
| | | | | 74/473.22 |
| 4,343,202 A | | 8/1982 | Osborn | |
| 4,541,300 A | | 9/1985 | Kwiatkowski et al. | |

(Continued)

FOREIGN PATENT DOCUMENTS

| EP | 1612455 A1 | * | 1/2006 | ......... F16H 59/0278 |
| WO | WO-2016012681 A1 | * | 1/2016 | ......... F16H 59/0278 |

*Primary Examiner* — William Kelleher
*Assistant Examiner* — Gregory Robert Weber
(74) *Attorney, Agent, or Firm* — James Dottavio; MacMillan, Sobanski & Todd, LLC (57) ABSTRACT

A vibration isolation system reduces rattling in a reverse lockout mechanism for a manual shifter. A shaft retained in a shifter housing has an upper end for a shift knob and an enlarged barrel section proximate the housing. A lockout skirt slides on the shaft between upper and lower positions. The lockout skirt has a shoulder extending radially outward, and the housing includes a stop block such that the shaft is prevented from pivoting to a reverse gear position when the lockout skirt is in the lower position and is free to move to the reverse gear position when the lockout skirt is in the upper position. A spring retained on the shaft biases the lockout skirt toward the lower position. A plurality of lubricated O-rings are disposed on the shaft to define sliding interfaces between the lockout skirt and the shaft and between the lockout skirt and the barrel.

7 Claims, 12 Drawing Sheets

(56) References Cited

U.S. PATENT DOCUMENTS

| | | | | |
|---|---|---|---|---|
| 4,916,966 A | * | 4/1990 | Weishaupt | B60K 20/02 |
| | | | | 403/114 |
| 5,722,296 A | * | 3/1998 | Nishigai | F16H 59/04 |
| | | | | 384/206 |
| 6,142,034 A | * | 11/2000 | Rempinski | F16H 59/042 |
| | | | | 403/56 |
| 7,562,602 B2 | * | 7/2009 | Blascok | F16H 59/042 |
| | | | | 74/473.21 |
| 8,132,482 B2 | | 3/2012 | Ciamillo | |
| 8,230,756 B2 | * | 7/2012 | Pajtas | F16C 1/10 |
| | | | | 74/473.22 |
| 8,312,787 B2 | | 11/2012 | Na et al. | |
| 8,336,422 B2 | * | 12/2012 | Choi | F16C 1/108 |
| | | | | 74/502.6 |
| 8,522,637 B2 | * | 9/2013 | Hahn | F16H 59/0208 |
| | | | | 74/470 |
| 8,733,200 B2 | | 5/2014 | Retsch | |
| 8,978,827 B2 | * | 3/2015 | Steele | F16H 57/05 |
| | | | | 184/15.1 |
| 2004/0255710 A1 | * | 12/2004 | Tucker | F16H 59/0208 |
| | | | | 74/473.29 |

* cited by examiner

MANUAL SHIFTER REVERSE LOCKOUT MECHANISM WITH VIBRATION ISOLATION SYSTEM

CROSS REFERENCE TO RELATED APPLICATIONS

This application claims priority to U.S. provisional application Ser. No. 62/236,181, filed Oct. 2, 2015, which is hereby incorporated by reference in its entirety.

STATEMENT REGARDING FEDERALLY SPONSORED RESEARCH

Not Applicable.

BACKGROUND OF THE INVENTION

The present invention relates in general to a gear shift selector for manual transmissions, and, more specifically, to a reverse lockout mechanism for a shifter.

A typical manual transmission shift lever consists of a metal shift rod with a plastic reverse lock out mechanism. The lock out prevents the shift lever from gating into reverse without first manually lifting a lock out ring. The lock out mechanism typically is comprised of three components, namely two plastic cylinders and a metal return spring. All three components slide (up and down) relative to a stationary metal shift rod. The shifter assembly is exposed to high levels of vibration because the shifter is bolted directly to the tail of the transmission. As a result, objectionable rattles and buzzes can propagate due to contact between the metal shift rod and the three components of the shifter lock out mechanism.

SUMMARY OF THE INVENTION

To remedy this problem, an isolation system disclosed herein prevents hard contact between the lock out mechanism components and the shift rod. The isolation mechanism allows for smooth sliding motion between the lock out mechanism and shift rod, while providing sufficient isolation to prevent rattle and buzz.

An isolation mechanism of the invention may include 1) a lubricated rubber O-ring between the top of the shift rod and the upper sliding section (i.e., lift ring), 2) a lubricated rubber O-ring between the middle of the shift rod and upper neck of the lower sliding section (i.e., lock out skirt), 3) a lubricated rubber O-ring between the bottom of the shift rod and the bottom of the lower lock out skirt, 4) at least one non-lubricated elastomeric bumper between the middle of the lock out skirt and a flattened portion of the shift rod, 5) a return spring with an elastomeric or damping material coating the spring, and 6) a tapered bumper mounted on the shaft as a bottom support or rest for the lift ring at its bottom position.

In one preferred embodiment, the invention provides a vibration isolation system for a reverse lockout mechanism in a manual shifter comprising a shaft. A lockout skirt and a plurality of lubricated O-rings are provided on the shaft. There is a gap between the inside diameter of the skirt and the outside diameter of the O-rings.

DETAILED DESCRIPTION OF PREFERRED EMBODIMENTS

Figure 1:
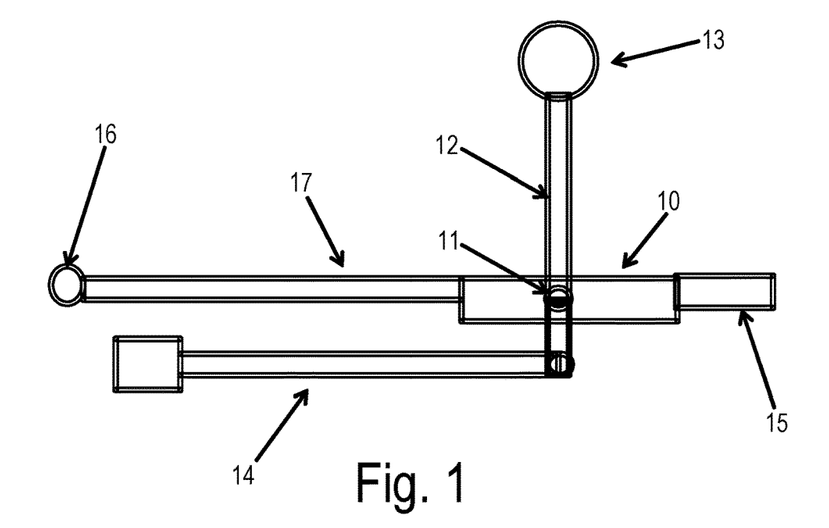
FIG. 1 is a schematic diagram showing elements of a shifter.

FIG. 1 generally depicts the functional elements of a manual transmission shifter. A shifter housing 10 has an internal opening receiving a pivot ball 11 of a shaft 12. Shaft 12 has a shift knob 13 on one end and attaches to a shift linkage 14 at the other end. For example, linkage 14 attaches to a transmission selector rod on a transmission (not shown). Linkage 14 rotates and moves longitudinally in response to movement of shaft 12 around a pivot point (i.e., ball 11) in housing 10. Housing 10 has a rear bushing for attaching to a vehicle body (not shown). A reaction arm 17 extends from the front of housing 10 to attach via a front bushing 16 to a transmission housing (not shown).

Figure 2:
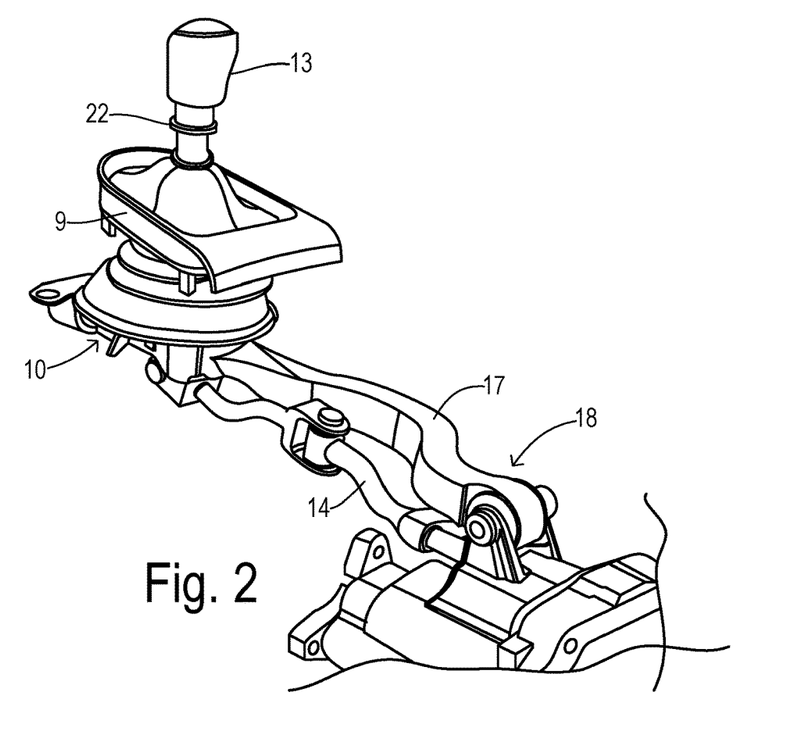
FIG. 2 is a perspective view of a shifter and portion of a transmission housing.
Figure 3:
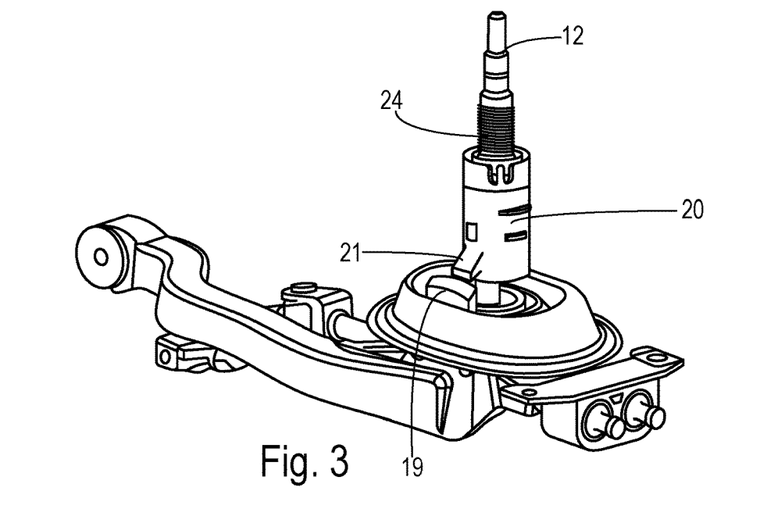
FIG. 3 is a perspective view of the shifter without a boot or lift ring.

FIGS. 2 and 3 show a transmission 18 connected with linkage 14 and reaction arm 17 of the manual shifter. Housing 10 receives shaft 12 which supports knob 13. To provide a reverse lockout feature, shifter housing 10 includes a stop block 19 that interfaces with a lower lockout skirt 20 having a shoulder 21 projecting towards stop block 19. Lockout skirt 20 is axially movable along shaft 12 in order to lift shoulder 21 over stop block 19 to allow shaft 12 to be moved into a gate for the reverse gear when the driver pulls upward on a lift ring (i.e., upper lockout skirt) 22 which is rigidly attached with lower lockout skirt 20. A return spring 24 normally urges lockout skirt 20 toward a downward position where movement into reverse is blocked. The shifter further includes a boot 9 which attaches to upper lift ring/lockout skirt 22. Lift ring 22 is slidable into a recess beneath knob 13 so that a driver can pull lift ring 22 upward when shifting into reverse.

Figure 4:
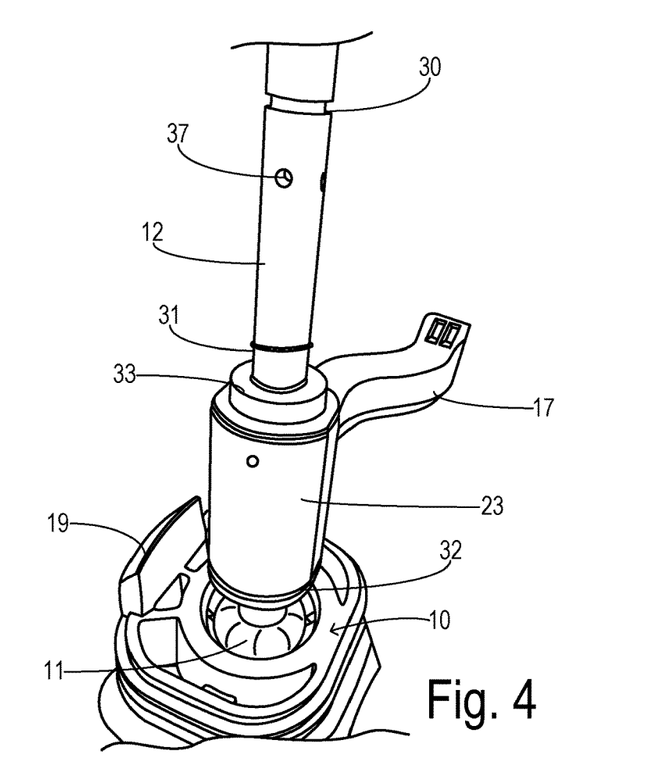
FIG. 4 is a perspective view of the shifter with a lockout skirt removed.
Figure 5:
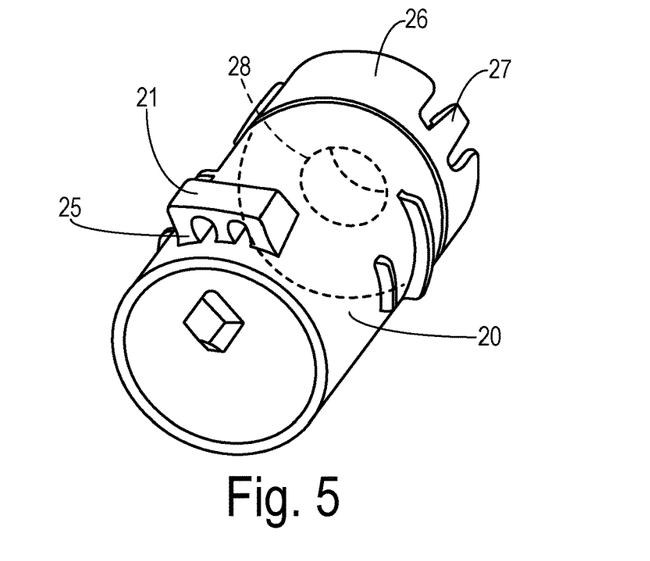
FIG. 5 is a perspective view of a lockout skirt.

FIG. 4 shows shaft 12 and housing 10 with lower lockout skirt 20 removed to reveal a barrel 23 mounted on shaft 12. As shown in FIG. 5, lower lockout skirt 20 may be generally cylindrical (e.g., has a generally cylindrical internal cavity) in order to encircle barrel 23. Shoulder 21 extends radially outward and has a slanted edge 25 for interfacing over a matching surface on stop block 19 to help guide the shifter into the reverse gate. At the upper end of lockout skirt 20, an outer ring 26 includes clips 27 for snapping together with corresponding features on the upper lockout skirt. An inner flange 28 has a central hole to receive shaft 12 and provides a small clearance (i.e., gap) with respect to shaft 12. One end of return spring 24 bears against flange 28.

Movable components which may tend to create rattle in the reverse lockout mechanism include the upper and lower lockout skirts and the return spring. By isolating these components with respect to shaft 12 and barrel 23, undesirable rattle and buzz can be reduced or avoided. The isolation system may include lubricated O-ring interfaces strategically placed as shown in FIG. 4. Thus, an upper groove 30 in shaft 12 is shown for receiving an O-ring at an axial position that interfaces with an inside diameter of the upper lockout skirt. An O-ring 31 is placed in another groove on shaft 12 corresponding to an inside diameter at the upper end of the lower lockout skirt. An O-ring 32 is mounted in another corresponding groove at the lower end of barrel 23 for interfacing with the lower end of lower lockout skirt 20. A disk-shaped bumper 33 may be mounted to the upper end of barrel 23 to avoid the thumping of a hard impact which could otherwise occur when a driver releases their grip on the upper lockout skirt and then the mechanism drops down into its rest position as a result of spring action.

Figure 6:
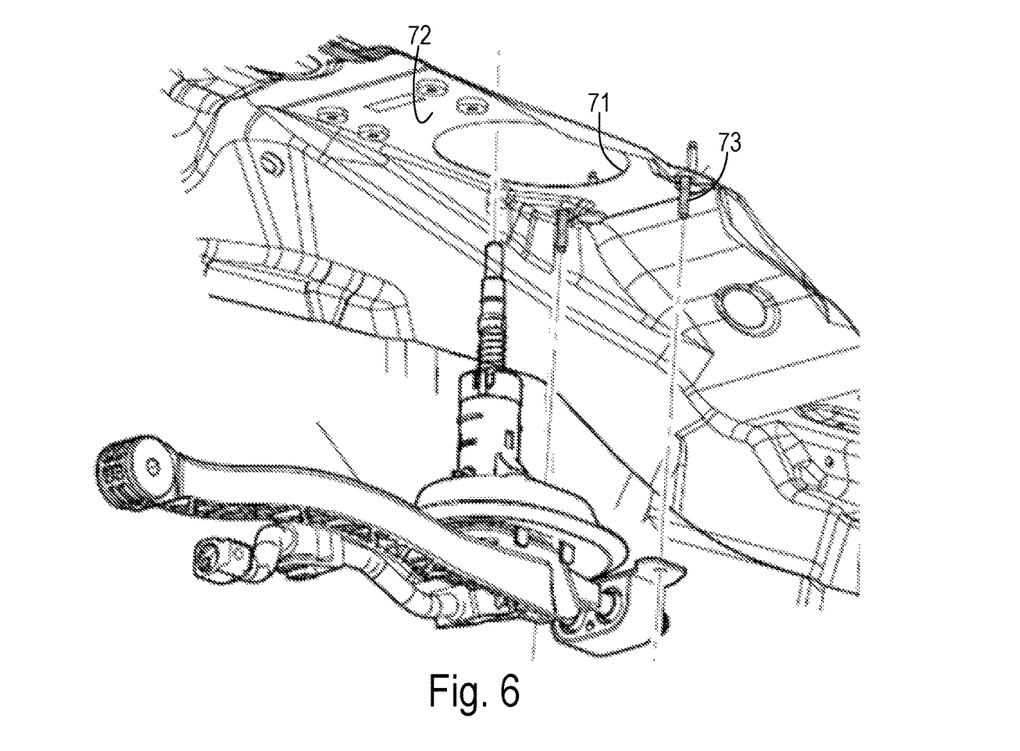
FIG. 6 is an exploded, perspective view showing the mounting of a shifter to a floor panel.

FIG. 6 illustrates the act of installing a shifter into a vehicle via an opening 71 in an upper front floor panel 72 next to a driver's seating position. After the portion of the shifter mechanism shown in FIG. 6 is installed up through floor panel 72 and attached by fasteners (e.g., fastener 73) and the housing is attached via the front and rear bushings, then a boot portion of the shifter as shown in FIG. 8 is installed from above.

Figure 7:
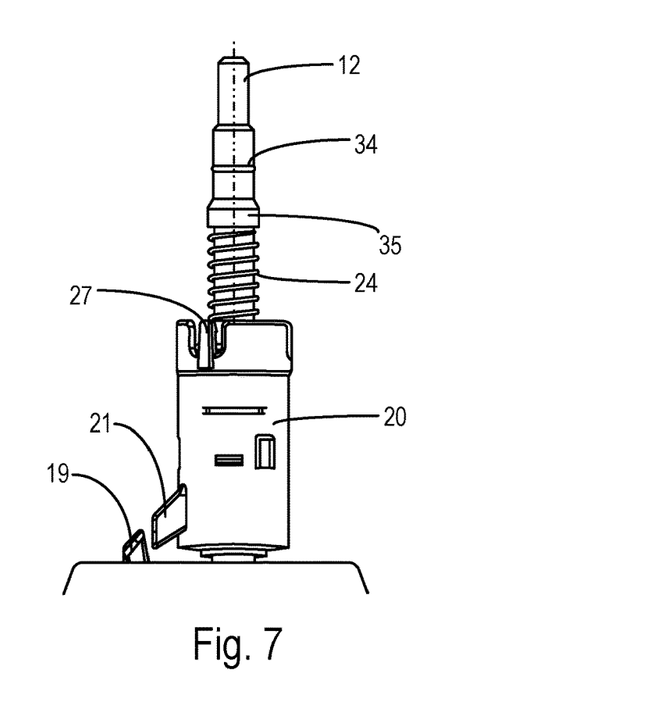
FIG. 7 is a side view of a shifter shaft and lockout skirt.

FIG. 7 shows additional details for the shifter mechanism assembly prior to attachment of the boot portion and upper lockout skirt. An O-ring 34 is installed in slot 30 and an additional O-ring/bumper 35 may be mounted on shaft 12 to provide a bottom stop for engaging a bottom edge of the upper lockout skirt/lift ring. Bumper 35 may be retained by a pin 36 (see FIG. 11) passing through a corresponding aperture 37 in shaft 12 (see FIG. 4). Bumper 35 or pin 36 may also provide an end stop and/or attachment for the upper end of return spring 24.

Figure 8:
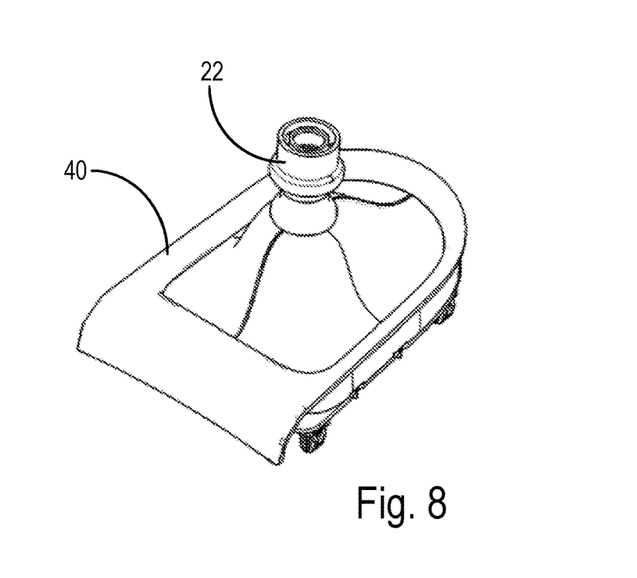
FIGS. 8-10 are a perspective view, cross-sectional view, and bottom view of a lift ring with a boot, respectively.
Figure 9:
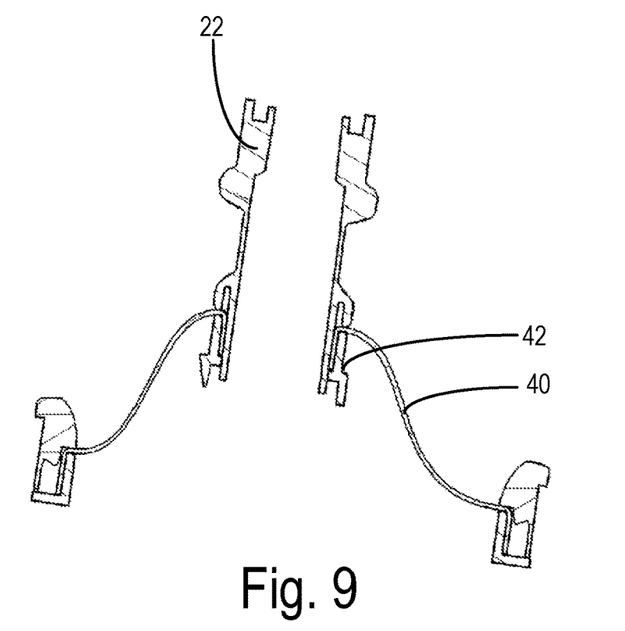
Figure 10:
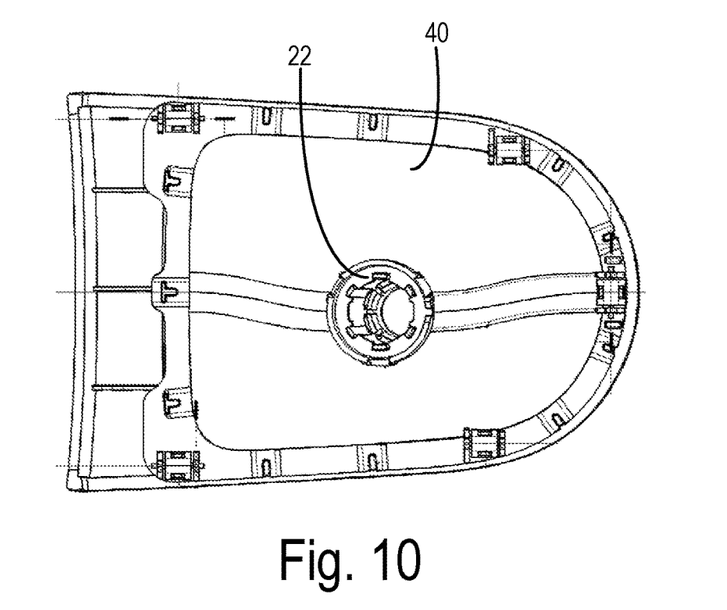

FIGS. 8-10 show boot portion 40 carrying upper lockout skirt 22 arranged so that shaft 12 extends through the top of skirt 22 for attachment with knob 13 (which screws onto the end of shaft 12). Skirt 22 includes ledge 42 for receiving clips 27 of the lower skirt.

Figure 11:
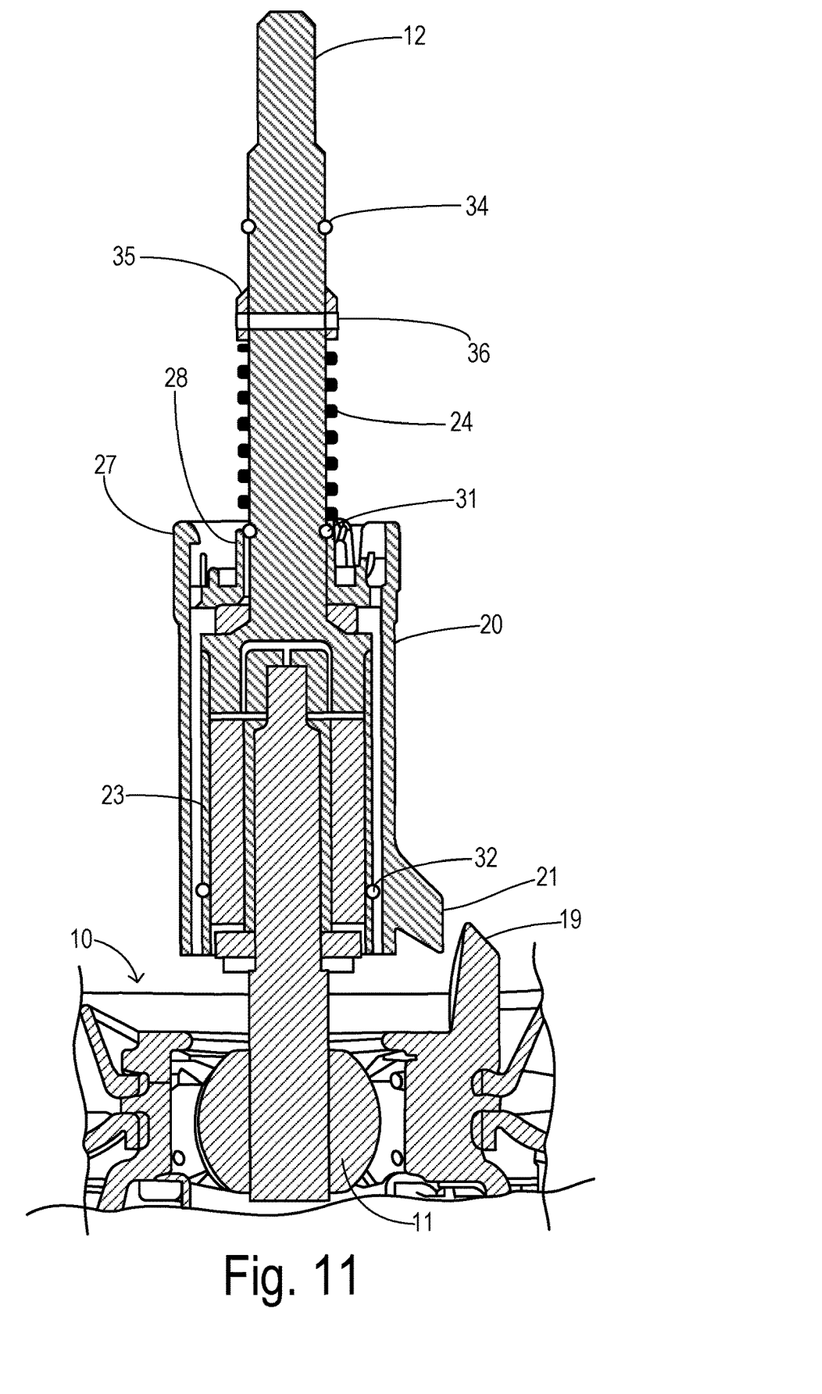
FIG. 11 is a cross section of a shifter including a lower lockout skirt.
Figure 12:
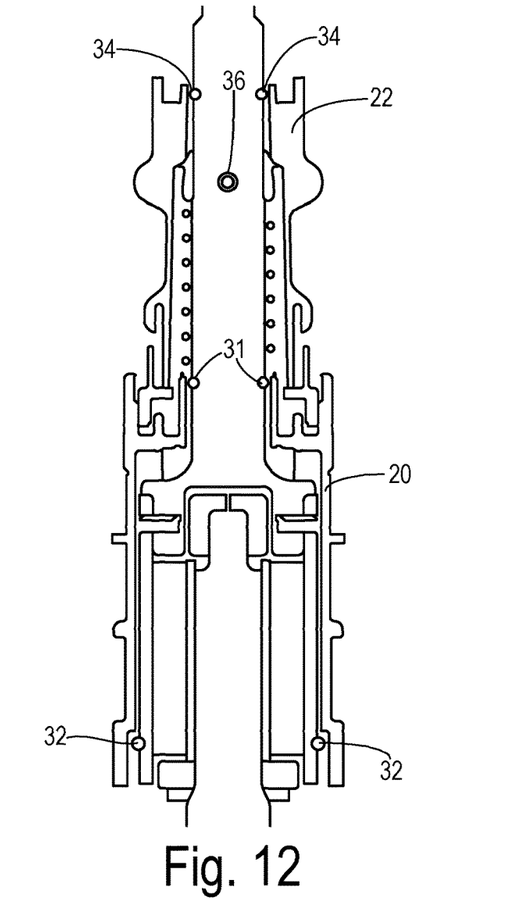
FIG. 12 is a cross section of a shifter including an upper lift ring.
Figure 13:
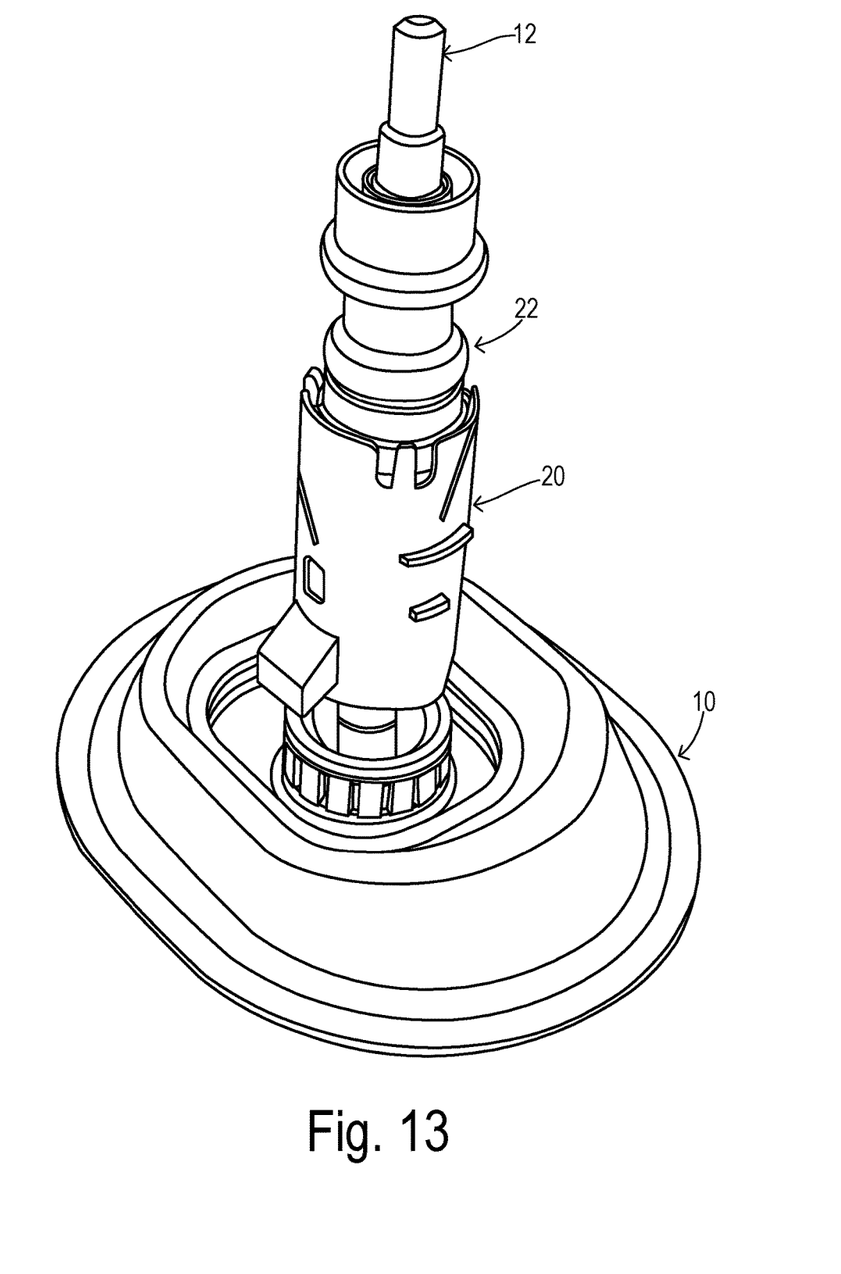
FIG. 13 is a perspective view showing the upper lift ring and lower lockout skirt mounted on the shaft.

FIG. 11 is a cross-section showing lower skirt 20 mounted on shaft 12 with spring 24 held in place between bumper 35/pin 36 and an upper end of the inner collar of skirt 20. From top to bottom, O-rings 34, 31, and 32 provide vibration isolation. FIG. 12 is a cross-section showing upper lockout skirt 22 snapped together with lower lockout skirt 20. The O-ring vibration isolators interface with the corresponding cylindrical surfaces, each of which has an axial length sufficient to provide a sliding distance necessary to lift up over the reverse lockout features. FIG. 13 is a perspective view showing skirts 20 and 22 snapped together over shaft 12.

In a preferred embodiment, the outer diameters of O-rings 34 and 31 and the corresponding inner diameters of skirts 41 and 17 are chosen such that an open clearance (i.e., gap) is maintained. Preferably, a lubricant such as grease is applied to the O-rings to obtain a freely slidable interface. O-ring 32 at the lower end of lockout skirt 17 may also be provided "in clearance," with or without a corresponding lubricant. Alternatively, any of the interfaces could be "in interference" (i.e., under slight compression) or flush if desired. The gap between O-ring 34 and skirt 22 is preferably about 0.26 mm (+/−0.225 mm), and the gap between O-ring 31 and the upper neck of skirt 20 is preferably about 0.27 mm (+/−0.225 mm). A similar gap is preferably used between O-ring 32 and the lower end of skirt 20.

Figure 14:
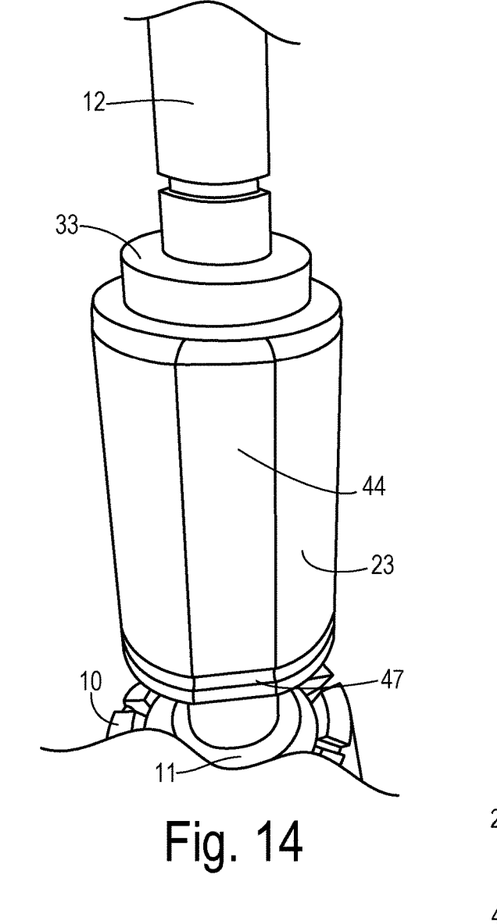
FIGS. 14 and 15 are perspective views of a keyed barrel for receiving the lower lockout skirt, with and without a rubber O-ring.
Figure 15:
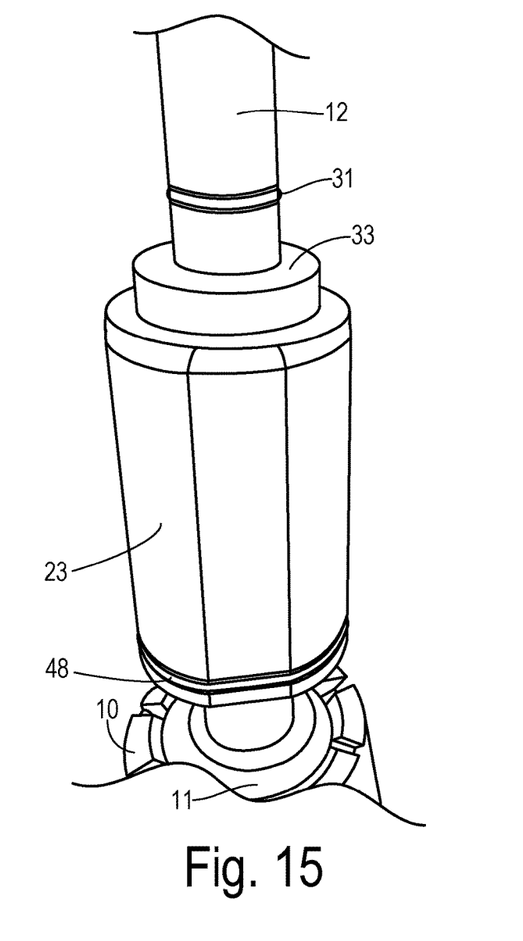
Figure 16:
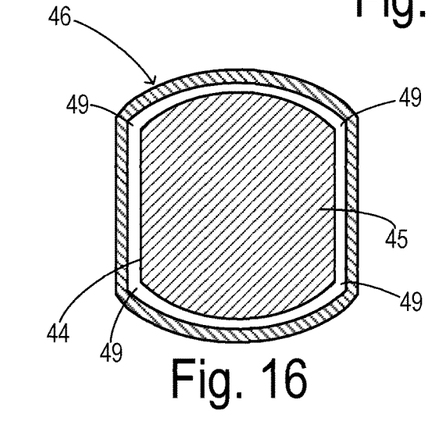
FIG. 16 is a horizontal cross section of a keyed barrel and lockout skirt.
Figure 17:
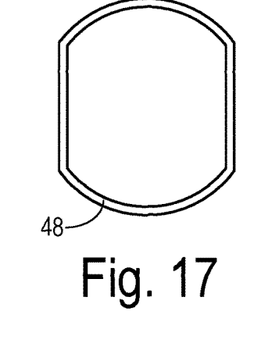
FIG. 17 is a top, plan view of an O-ring for the keyed barrel of FIGS. 14-16.

As shown in FIGS. 14-16, barrel 23 may include flats 44 and 45 on opposite longitudinal sides. A lower skirt 46 has a matching profile in order to reduce or eliminate the ability of skirt 46 from rotating about the axis of the shaft as would be possible with a circular shape. A circumferential groove 47 is provided at the lower end of barrel 23 for receiving O-ring 48 which may have a specially molded shape (e.g., molded rubber) as shown in FIG. 17 to match the shape of groove 47. Alternatively, a circular O-ring can be used by stretching it over groove 47. While the non-circular profile of barrel 23 and skirt 46 prevent rotation of the reverse lockout mechanism, the possibility of rattle at the corners 49 along the lateral side edges of flats 44 and 45 is introduced. To further reduce the occurrence of rattling and/or rotation, the interface between O-ring 48 installed in groove 47 and the inside surface of a skirt 46 could preferably include an interference fit (e.g., without any lubrication).

Figure 18:
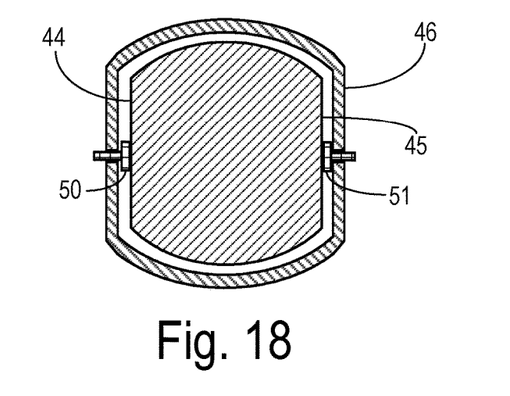
FIG. 18 is a cross section of an alternative embodiment of a keyed barrel and lockout skirt with sliding bumpers.
Figure 19:
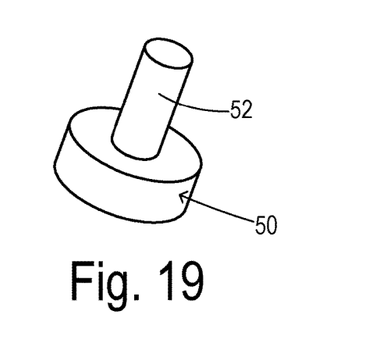
FIG. 19 is a perspective view of the bumper of FIG. 18.
Figure 20:
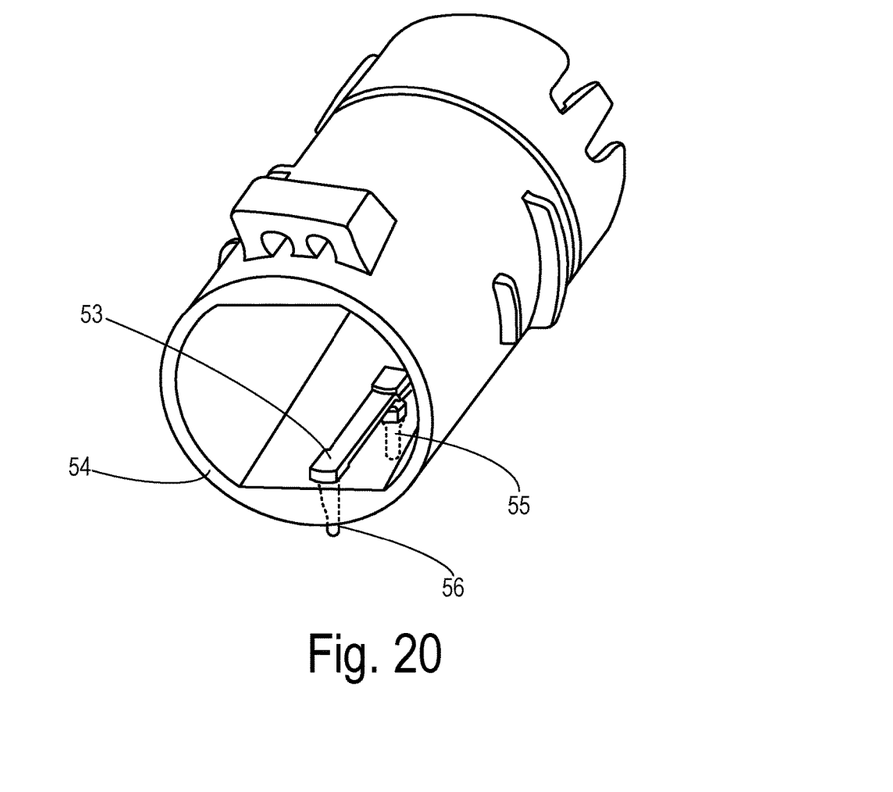
FIG. 20 is a perspective view of another embodiment of the lockout skirt.

In an alternative embodiment shown in FIG. 18, instead of an O-ring to reduce rattling of specially-shaped lockout skirt 46 on barrel 23, resilient bumpers 50 and 51 may be mounted to an interior surface of skirt 46 to interface (either "in interference" or "in clearance") with flats 44 and 45, respectively. Bumpers 50 and 51 may be comprised of rubber, for example. In one embodiment of an interference fit, an overlap in the nominal dimensions of the barrel and bumpers may be about 0.2 mm (+0.1/−0.2 mm). As shown in FIG. 19, bumper 50 may have a tab 52 for extending through a mounting hole in the side of the lower lockout skirt. As shown in FIG. 20, a bumper strip 53 can be mounted along an inside surface of a lockout skirt 54 by a pair of tabs 55 and 56 captured in respective mounting holes in the lockout skirt.

Figure 21:
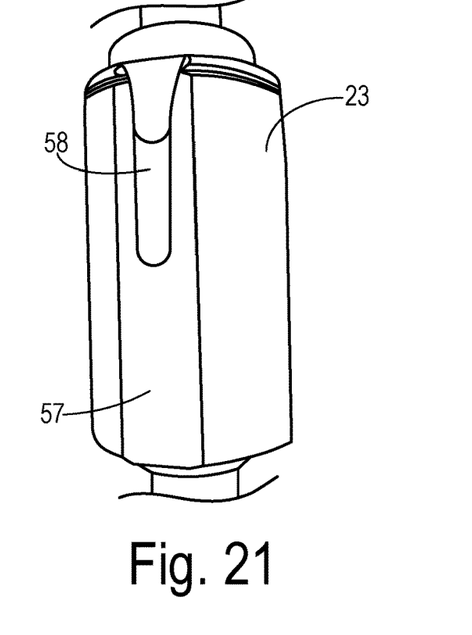
FIG. 21 is a side view of an alternative embodiment of a keyed barrel.
Figure 22:
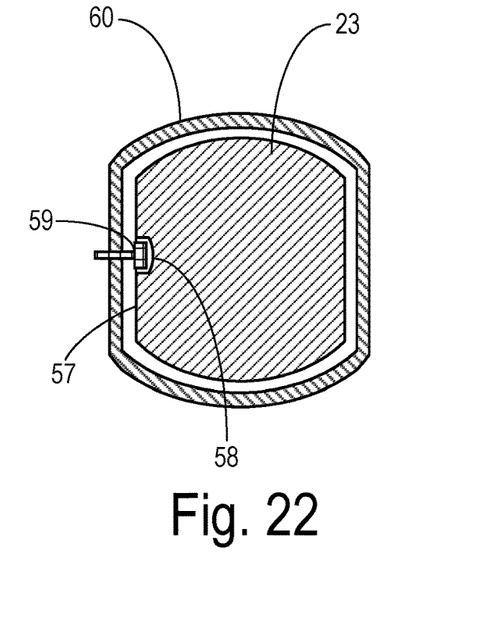
FIG. 22 is a cross section of an alternative embodiment of a sliding bumper and keyed barrel.

As shown in FIG. 21, barrel 23 may include a side flat 57 with a longitudinal notch 58 machined into the top edge of flat 57. As shown in cross-section in FIG. 22, a matching lower lockout skirt 60 may have a mounting hole for a bumper 59 arranged to ride within notch 58 in a manner that prevents rotation of lockout skirt 60 (thereby keeping it centered on barrel 23).

Figure 23:
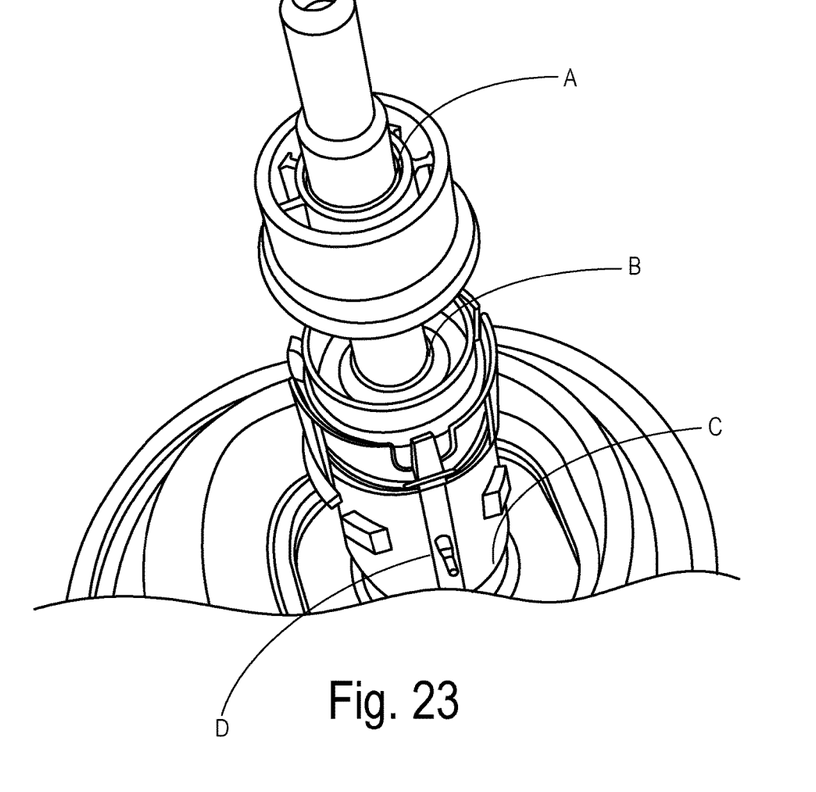
FIG. 23 is a perspective view of the shifter identifying the sliding interfaces.

FIG. 23 indicates sliding interfaces A-D that can be employed in the isolation system of the invention. Interface A is between the upper lockout skirt/lift ring and the shaft. The upper lockout skirt is partially removed in order to shown Interface B which is between an upper end of the lower lockout skirt and the shaft. Interface C is between the lower end of the lower lockout skirt and the shaft. Interface D is between the lower lockout skirt and a flat or groove on the barrel for preventing rotation of the lower lockout skirt.

Figure 24:
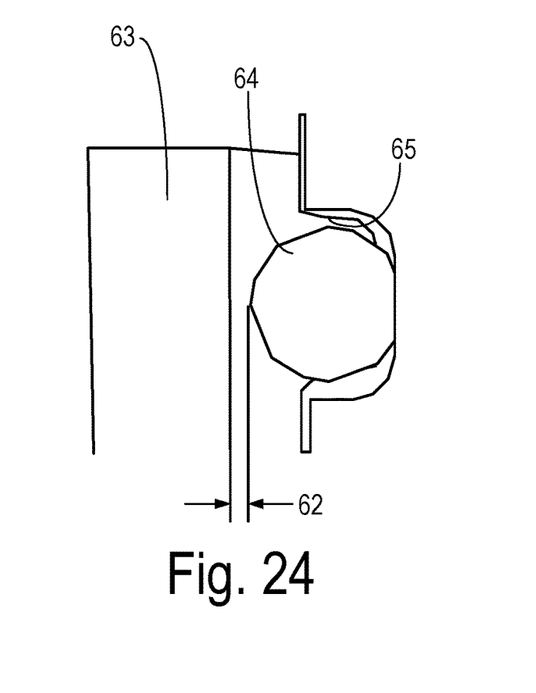
FIGS. 24 and 25 depict O-rings at sliding interfaces with a preferred clearance, with and without lubricant, respectively.
Figure 25:
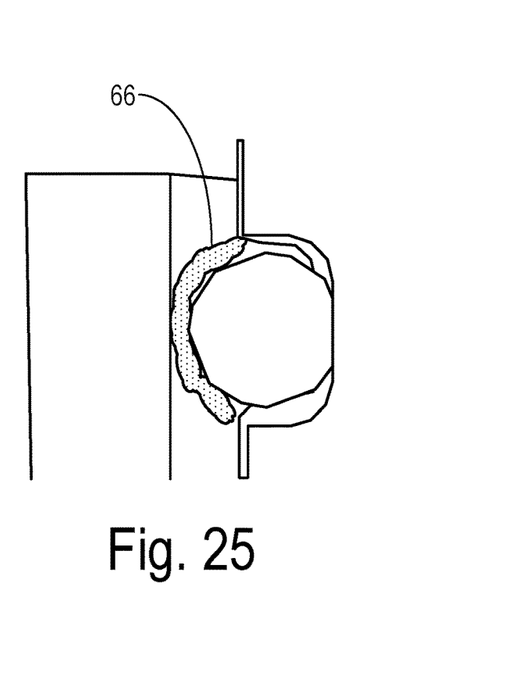

FIG. 24 shows an interface "in clearance" with a gap 62 between a lockout skirt 63 and an O-ring 64 in a groove 65 on the shifter shaft or barrel. FIG. 25 shows a lubricant 66 applied to O-ring 64 and packing the gap 62. In order to achieve an acceptable balance between stability of the lockout skirts and ease of up/down motion, the gap size is a critical parameter. For at least interfaces A and B, a gap in the range of about 0.1 to 0.4 mm is selected, with the gap most preferably being about 0.26 mm (+/−0.225 mm). Interface C may also be in clearance, using the same range. Interface D (corresponding to the bumpers of FIGS. 18-20) may use an "in interference" interface with an interference overlap in the range of about 0.0 to about 0.3 mm, with a most preferred overlap of 0.2 mm.

To address rattle related to the return spring, a metal coiled spring is utilized with a damping material coating the return spring (or the underlying shaft). The damping material can be a resilient material such as rubber or foam. A clearance between the inside diameter of the return spring and the shaft may be about 0.47 mm (+/−0.3 mm), for example.

What is claimed is:

1. A vibration isolation system for a reverse lockout mechanism in a manual shifter for a motor vehicle, comprising:
    a shifter housing;
    a shaft pivotally retained in the housing and having an upper end adapted to receive a shift knob, wherein the shaft has a barrel proximate to the housing;
    a lockout skirt slidably mounted over the shaft between upper and lower positions, wherein the lockout skirt has an internal cavity receiving the barrel, wherein the lockout skirt has a shoulder extending radially outward, and wherein the housing includes a stop block such that the shaft is prevented from pivoting to a reverse gear position when the lockout skirt is in the lower position and is free to move to the reverse gear position when the lockout skirt is in the upper position;
    a spring retained on the shaft and biasing the lockout skirt toward the lower position; and
    a plurality of lubricated O-rings on the shaft defining sliding interfaces radially disposed between the lockout skirt and the shaft and between the lockout skirt and the barrel preventing radial contact of the shaft with the lockout skirt and with the barrel, thereby isolating the lockout skirt and the barrel from vibrations of the shaft.

2. The system of claim 1 wherein there is a gap between an inside diameter of the lockout skirt and an outside diameter of the O-rings.

3. The system of claim 1 wherein the barrel has a generally cylindrical shape with at least one flat surface, and wherein the internal cavity defines a matching surface to limit rotation of the lockout skirt on the barrel.

4. The system of claim 3 further comprising a resilient bumper mounted to the lockout skirt for engaging the flat surface.

5. The system of claim 4 wherein the flat surface further comprises a longitudinal notch for slidably receiving the resilient bumper.

6. The system of claim 3 wherein the barrel includes a circumferential groove retaining one of the lubricated O-rings, and wherein the O-ring has a molded shape matching the generally cylindrical shape and flat surface of the barrel.

7. The system of claim 1 wherein the lockout skirt is comprised of a lower lockout skirt and an upper lockout skirt that are rigidly attached, wherein the upper lockout skirt includes a lift ring adapted to be grasped by a driver of the vehicle for lifting to the upper position and compressing the spring.

* * * * *